United States Patent [19]

Trayer

[11] 4,442,471

[45] Apr. 10, 1984

[54] METHOD AND APPARATUS FOR SHORT CIRCUIT PROTECTION OF HIGH VOLTAGE DISTRIBUTION SYSTEMS

[76] Inventor: Frank C. Trayer, 25690 LaLanne Ct., Los Altos Hills, Calif. 94022

[21] Appl. No.: 358,200

[22] Filed: Mar. 15, 1982

Related U.S. Application Data

[62] Division of Ser. No. 172,211, Jul. 25, 1980, Pat. No. 4,336,520.

[51] Int. Cl.³ .............................................. H02H 7/00

[52] U.S. Cl. ........................................ 361/63; 361/93; 361/104

[58] Field of Search ...................... 361/104, 93, 96, 63

[56] References Cited

U.S. PATENT DOCUMENTS

| | | | |
|---|---|---|---|
| 1,776,130 | 9/1930 | Petch | 361/63 |
| 3,510,811 | 5/1970 | Pokorny et al. | 361/104 X |
| 3,987,340 | 10/1976 | Kussy | 361/104 X |
| 4,068,283 | 1/1978 | Russell | 361/96 X |

*Primary Examiner*—Reinhard J. Eisenzopf
*Attorney, Agent, or Firm*—Murray K. Hatch

[57] ABSTRACT

A short circuit protection system is disclosed in which a trip-free circuit breaker is combined with at least one current limiting fuse whereby to provide full range short circuit clearing capacity in voltage ranges in which full range fuses are not available or economical.

15 Claims, 7 Drawing Figures

METHOD AND APPARATUS FOR SHORT CIRCUIT PROTECTION OF HIGH VOLTAGE DISTRIBUTION SYSTEMS

This is a division of application Ser. No. 172,211 filed July 25, 1980 now U.S. Pat. No. 4,336,520.

BACKGROUND OF THE INVENTION

1. Field of the Invention

My present invention relates to high voltage electrical switchgear, and more particularly to methods and apparatus for short circuit protection of high voltage electrical distribution systems.

2. Description of Prior Art

Methods and apparatus for rapidly breaking high voltage circuits in response to electrical remote control fault signals are known in the prior art. For instance, such an apparatus and corresponding method of operation are shown and described in my prior U.S. Pat. No. 3,794,798, and more particularly in FIG. 5 thereof, and in the part of the specification thereof related to FIG. 5.

Such prior art high voltage short circuit protection methods and apparatus, however, involve the use of vacuum circuit breakers provided with contacts having very high fault current interrupting capacity, at considerable cost, in order to clear faults over a wide range of currents.

Further, such prior art high voltage short circuit protection methods and apparatus require independent energizing current sources if full protection against the consequences of closing their breaker contacts into faults is to be provided.

It is believed that the documents listed immediately below contain information which might be considered to be material to the examination of this patent application.

U.S. Pat. No. 3,084,238
U.S. Pat. No. 2,500,429
U.S. Pat. No. 2,905,787
U.S. Pat. No. 3,471,669
U.S. Pat. No. 3,522,404
U.S. Pat. No. 3,526,735
U.S. Pat. No. 3,794,798
U.S. Pat. No. 4,170,000

No representation is made that any of the above listed documents is part of the prior art, or that a search has been made, or that no more pertinent information exists.

SUMMARY OF THE INVENTION

Accordingly, it is an object of my present invention to provide methods and apparatus for short circuit protection on utility high voltage distribution circuits, and more particularly on underground circuits requiring "total dead front" equipment.

Another object of my present invention is to provide improved methods and apparatus for full range short circuit protection on 24.9 kilovolt and 34.5 kilovolt distribution systems where full range oil immersed fuses of ample continuous current carrying ability are not readily available.

Yet another object of my present invention is to provide increased flexibility of protection for electrical distribution systems rated at 5 kilovolts through 34.5 kilovolts.

A further object of my present invention is to provide self-contained high voltage short circuit protection systems which can be safely closed into high current faults without the provision of auxiliary standby power for operating fault detecting or breaker tripping means.

Yet another object of my present invention is to provide short circuit protection apparatus for high voltage distribution systems, which apparatus derive their operating energy from the protected high voltage lines and can derive and store sufficient operating energy to clear a high current fault during the short period of time between the closing of the circuit breaker of the protection system into such a fault and the need to trip the circuit breaker to prevent equipment damage.

A still further object of my present invention is to provide full range short circuit protection apparatus for high voltage distribution systems, each such apparatus comprising at least one current limiting fuse and a vacuum circuit breaker, wherein the circuit breaker contacts have relatively low fault interrupting capacity and are therefore quite economical.

It is another object of my present invention to provide short circuit protection apparatus for high voltage distribution systems, which apparatus provide full range fault protection with very high interrupting capacity and extremely good system coordination characteristics, and do so at higher continuous current than is presently available in full range fusing above 15 kilovolts.

Yet another object of my present invention is to provide an energy source for powering switchgear located closely adjacent high voltage distribution lines, which energy source allows operating voltage to be supplied much more economically and occupies less space than would a fused potential transformer employed for the same purpose.

An additional object of my present invention is to provide short circuit protection equipment for use on high voltage distribution systems which lends itself to sensitive ground overcurrent relaying the like of which is not available with simple fused equipment.

A still further object of my present invention is to provide methods and apparatus for tapping switchgear operating energy from high voltage, e.g., 25 kilovolt to 35 kilovolt, power lines, which methods and apparatus provide great reduction in expense as compared with the use of fused potential transformers at such voltages.

An additional object of my present invention is to provide methods and apparatus for deriving energy from high voltage distribution lines without the need for expensive high voltage potential transformers or high voltage cable terminations.

Another object of my present invention is to provide methods and apparatus for deriving energy from high voltage cables without the use of means permanently coupled thereto, and without the need for disturbing existing high voltage connections.

Yet another object of my present invention is to provide means for charging storage batteries from high voltage distribution cables without the use of means permanently coupled thereto, and without the need for disturbing existing high voltage connections.

Another object of my present invention is to provide a new and unique operating linkage which when fitted to the toggle-operated submersible switch of my U.S. Pat. No. 3,794,798 converts that switch into a mechanically trip-free vacuum circuit breaker which does not require a cocking operation to activate it as a circuit breaker and which can be reset by operating the switch actuator through two standard switch actuating operations without the necessity for separate or special breaker resetting means.

Other objects of my present invention will in part be obvious and will in part appear hereinafter.

My present invention, accordingly, comprises the several steps and the relation of one or more such steps with respect to each of the others, and the apparatus embodying features of construction, combinations of elements, and arrangements of parts which are adapted to effect such steps, all as exemplified in the following disclosure, and the scope of the present invention will be indicated in the appended claims.

In accordance with a principal feature of my present invention, a trip-free vacuum circuit breaker is provided by equipping a toggle-operated submersible switch of the kind shown and described in my prior U.S. Pat. No. 3,794,798 with a solenoid operated trip-free operating mechanism which, when tripped, immediately displaces the fixed pivots of the second toggle mechanism thereof and thus opens the vacuum switch or switches which are otherwise controlled by said second toggle mechanism.

In accordance with another principal feature of my present invention, induction-coupled stored energy devices are provided which derive energy from high voltage distribution lines by means of donut-type current transformers, and which are capable of very rapidly storing sufficient quantities of the derived energy to operate, e.g., a trip-free vacuum circuit breaker of my present invention.

In accordance with yet another principal feature of my present invention, high voltage short circuit protection systems are provided which comprise trip-free vacuum circuit breakers of my present invention and partial range oil immersible current limiting fuses, which systems permit the use of vacuum circuit breaker contacts having relatively low fault current interrupting capacity, and which are therefore quite economical, and at the same time provide full range fault protection with very high interrupting capacity, extremely good system coordination characteristics, and a higher continuous current rating than is currently available in full range fusing above 15 kilovolts, and which may incorporate induction-coupled stored energy devices of my invention as their tripping and operating power sources.

For a fuller understanding of the nature and objects of my present invention, reference should be had to the following detailed description, taken in connection with the accompanying drawings.

DESCRIPTION OF THE PREFERRED EMBODIMENTS

Figure 1:
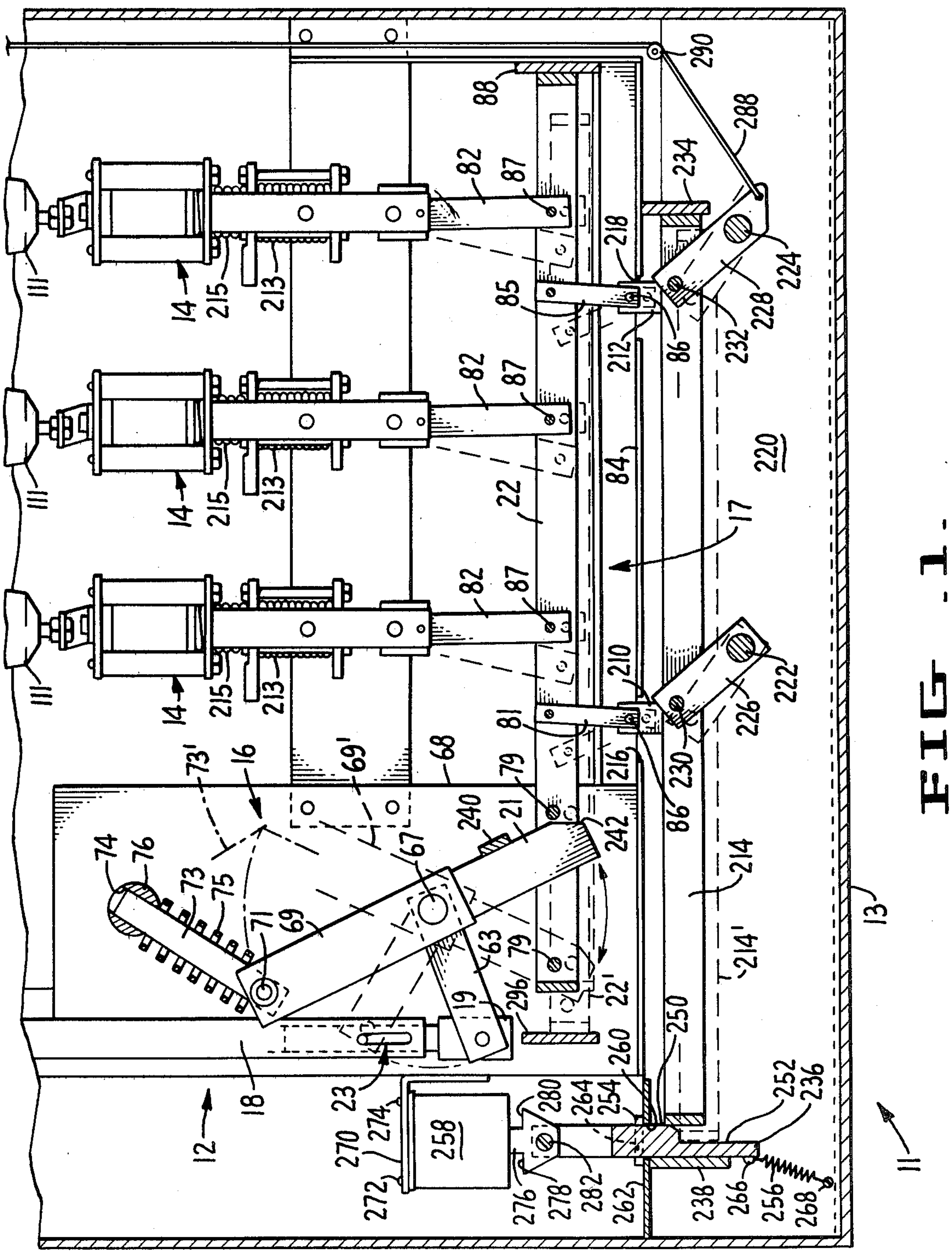
FIG. 1 is an elevational view, in section, of a toggle-operated submersible switch incorporating a trip-free operating mechanism embodying my present invention.

Referring now to FIG. 1, there is shown a vacuum circuit breaker of the kind disclosed in my abovesaid U.S. Pat. No. 3,794,798, provided with a trip-free operating mechanism embodying certain teachings of a first principal feature of my present invention.

As may be seen by comparison of FIG. 1 with my said U.S. Pat. No. 3,794,798, certain structural details of mechanisms shown and described in that patent are shown in FIG. 1 and described in the present specification. In order to clearly distinguish the structural details of that patent which are shown in FIG. 1 hereof from structural details embodying teachings of my present invention which are shown in FIG. 1 hereof, the reference numerals designating those structural details found in my said U.S. Pat. No. 3,794,798 will be the same as the reference numerals used in that patent to designate the same structural details, and those reference numerals will be less than 199; whereas the reference numerals designating structural features of my present invention found in FIG. 1 will be 200 or greater.

Thus, for example, the vacuum circuit breaker of my said U.S. Pat. No. 3,794,798 is contained in a tank 13, and the corresponding tank in FIG. 1 hereof is also designated by the reference numeral 13.

Comparing FIG. 1 hereof with my said U.S. patent, then, it will be seen that tank 13 of FIG. 1 contains, in addition to the usual transformer oil or other suitable insulating fluid, three vacuum switches or switch contact assemblies 14. The terminals of vacuum switches 14 are connected by means of suitable conductors to insulated connectors, such as ESNA-type connectors of the kind shown and described in my U.S. Pat. No. 3,522,404, which are themselves mounted fluid-tightly in suitable openings in the top of tank 13, all as shown and described in my said U.S. Pat. No. 3,794,798, each vacuum switch 14 having associated with it a connector 111 and a connector 116 (not shown) by means of each of which a submersible high-voltage cable, equipped with a suitable plug-type connector, can be readily connected to and disconnected from the associated terminal of the associated switch 14.

In the well-known manner, tank 13 may be substantially completely filled with said transformer oil or the like.

As further seen in FIG. 1, the vacuum circuit breaker 11 of my present invention includes a toggle operating mechanism generally indicated by the reference numeral 12, contained within tank 13, which tank also contains said vacuum switches 14.

Toggle operating mechanism 12 serves to operate a first toggle mechanism generally designated by the reference numeral 16.

Toggle mechanism 16 serves to operate a second toggle mechanism, of the parallelogram type, which is generally designated herein by the reference numeral 17.

As further seen in FIG. 1, toggle operating mechanism 12 comprises a first operating link 18 and a second operating link 19.

Said first toggle mechanism 16 comprises a coupling arm 21, whereby the forces generated by the operation of toggle mechanism 16 are transmitted to said second toggle mechanism 17 to operate said second toggle mechanism 17.

Said second toggle mechanism 17 comprises a horizontal link 22 from which opening and closing forces are transmitted to the respective switches 14 in the manner hereinafter described.

As also seen in FIG. 1, toggle operating mechanism 12 includes a lost-motion connection 23, interconnecting link 18 and link 19 to selectively transmit motion therebetween.

An upper portion of link 18 (not shown) is interconnected with a manual or motor-operated actuator, such as that shown in my U.S. Pat. No. 3,794,798. This actuator passes through a wall of tank 13 in fluid-tightly sealed manner, and is adapted to drive link 18 upwardly or downwardly to actuate toggle mechanism 16 for the opening or closing of breaker 11.

As taught in my said prior U.S. Pat. No. 3,794,798, a pivot 67 supported between a pair of fixed mounting plates 58 (only one shown) pivotably supports the lower link 69 of first toggle mechanism 16.

Coupling link 21 and a tripping link 63 are both affixed to lower link 69 of toggle mechanism 16 for conjoint rotation therewith about pivot 67.

As taught in my said prior U.S. Pat. No. 3,794,798, a pivot 71 is provided at the upper end of lower link 69 of toggle mechanism 16. The upper link 73 of toggle mechanism 16 is pivotably affixed to pivot 71. In the well-known manner, a coil spring 75 surrounds upper link 73, and is compressed between pivot 71 and the upper pivot of upper link 73, which is itself mounted between said mounting plates 68, and is referred to by the reference numeral 76. In the well-known manner, the upper end of link 73 is slidably received in a transverse bore 74 which passes completely through upper pivot 76.

(Lost-motion connection 23 is provided to isolate said manual or motor-operated actuator, which upwardly and downwardly actuates link 18, from the violent motions which result from the tripping of toggle mechanism 16.)

Referring again to FIG. 1, it will be seen that a pair of pins 79 are affixed to horizontal link 22 of parallelogram toggle mechanism 17 on opposite sides of the coupling link 21 of toggle mechanism 16.

Thus, it will be seen that link 22 will be driven to the right (in FIG. 1) when toggle mechanism 16 is tripped by downward motion of link 18, and will be driven to the left when link 18 is raised sufficiently to trip toggle mechanism 16, i.e., drive it through its center position.

(In the remaining description of the parts of vacuum circuit breaker 11 which are shown and described in my said prior U.S. Pat. No. 3,794,798 it will be assumed that the two pivots 86 shown in FIG. 1 hereof are untranslatably fixed in their positions indicated in FIG. 1, e.g., to the web of a channel member 84.)

As will now be evident to those having ordinary skill in the art, informed by the present disclosure, parallelogram toggle 17 comprises said horizontal link 22, a pair of links 81, 85 pivotably mounted on said pivots 86, and three links 82, each one of which is pivotably attached to the moving part of a corresponding vacuum switch 14 and also pivotably attached to horizontal link 22 by means of a pivot 87.

As also seen in FIG. 1, toggle mechanism 17 further comprises a stop 88, a stop 296, described hereinbelow, and the respective springs 213 and 215 (described hereinbelow) of each vacuum switch 14.

As will be evident to those having ordinary skill in the art, informed by the present disclosure, all of the switches 14 will be closed when horizontal link 22 is in its rightmost position (against stop 88) as shown in FIG. 1, since links 81 and 85 are at that time in a slightly over-center position, and thus link 22 is substantially in its upwardmost position.

As will also be evident to those having ordinary skill in the art, all of the switches 14 will be open when horizontal link 22 is in its leftwardmost (dashed) position 22', i.e., in contact with stop 296; since links 81 and 85 will be at that time considerably remote from their vertical positions, and thus link 22 will be considerably downwardly displaced from its uppermost position.

As explained hereinabove, toggle mechanism 17 is manipulated between these two extreme positions of horizontal link 22, and thus the switches 14 are opened and closed, when first toggle mechanism 16 is manipulated between its two stable positions by means of link 18, working through link 19 and tripping link 63. As explained hereinabove, link 18 is operated to trip first toggle mechanism 16 by means of a manual or motor-driven actuator which passes through a wall of tank 13 in fluid-tightly sealed manner.

Having first briefly described the vacuum circuit breaker mechanism of my said U.S. Pat. No. 3,794,798, the trip-free operating mechanism of my present invention, which constitutes an improvement therein, will be now be described.

In describing the trip-free operating mechanism of my present invention in connection with FIG. 1, it is first to be understood that the assumption made hereinabove that the pivots 86 are untranslatable no longer obtains.

Rather, the two pivots 86 are mounted on ears 210 and 212, respectively, both of which are integral with and project upwardly from a horizontal link 214. Ears 210 and 212, respectively, pass through openings 216, 218 in the lower flange of channel member 84, which is itselt affixed to tank 13, and thus is not movable with respect to tank 13. Both of the openings 216, 218 are large enough to provide clearance for ears 210 and 212 throughout the complete range of motion of horizontal link 214 as described hereinbelow.

As also seen in FIG. 1, a frame 220 is affixed to and depends from channel member 84, and a pair of pivots 222, 224 are affixed to frame 220. That is to say, pivots 222, 224 are immovable with respect to channel 84 and tank 13.

Further, horizontal link 214 is movably mounted on frame 220, i.e., with respect to tank 13, by means of a pair of pivotable links 226, 228. Link 226 is pivotably affixed to frame 220 by means of pivot 222, and is pivotably affixed to link 214 by means of another pivot, 230. Similarly, link 228 is pivotably affixed to frame 220 by means of pivot 224, and is pivotably affixed to link 214 by means of pivot 232.

Thus, it will be seen by those having ordinary skill in the art that if the two pivots 86 were removed, link 214 would be free to move between two extreme positions, in which positions its left-hand and right-hand ends would contact the stop 234 and the face 252 of stop 236, respectively, assuming the stop 236 to be raised as far as possible.

Stop 234 is immovably affixed to frame 220.

As seen in the left-hand portion of FIG. 1, stop 236 is a movable stop, and is backed by a stop 238 which, like stop 234, is immovably affixed to frame 220.

It should further be noted that, in accordance with the teachings of my present invention, coupling arm 21 is prevented from contacting the right-hand (as seen in FIG. 1) pin 79 on horizontal link 22 by means of a stop 240, and because of the angular cutaway portion 242 at the outer end thereof. Thus, horizontal link 22 can drop downwardly from its "switch closed" position shown in solid in FIG. 1, as hereinafter explained, without interference from contact between coupling arm 21 and right-hand pin 79.

As also seen in FIG. 1, movable stop 236 is a two-step stop, capable of presenting either a high step or face 250 or a low step or face 252 to the adjacent end of horizontal link 214, depending upon its vertical position.

The vertical position of movable stop 236 is determined by a limit stop 254, a coil spring 256, and a solenoid 258.

As seen in FIG. 1, movable stop 236 passes through a close-fitting opening 260 in flange 262 of frame 220. Thus, movable stop 236 is maintained in closely adjacent relation to the right-hand face of fixed stop 238, as seen in FIG. 1. Fixed stop 238 is immovably secured to frame 220 with one of its major faces closely adjacent the left-hand edge of opening 260, as seen in FIG. 1.

As also seen in FIG. 1, limit stop 254 passes through a bore 264 in movable stop 236. Limit stop 254 is fixed in bore 264 in such manner that its ends project from the opposite sides of movable stop 236. Thus, the maximum downward movement of movable stop 236 is determined by limit stop 254, which bears upon flange 262 of frame 220 when movable stop 236 is in its downwardmost position.

Coil spring 256 is affixed at its upper end to movable stop 236, as by a suitable screw 266. The lower end of coil spring 256 is affixed to frame 220, near the lower edge thereof, e.g., by being engaged with an opening 268 in one of the platelike members of frame 220. It is to be particularly noted that opening 268 is not directly below movable stop 236, but rather somewhat to the left thereof as seen in FIG. 1, whereby spring 256 tends to resiliently bias movable stop 236 into contact with the adjacent face of fixed stop 238.

Solenoid 258 is substantially immovably mounted on mounting plates 68 by means of a suitable bracket 270. The vertical portion of bracket 270 is affixed to the left-hand edges of mounting plates 68, as by welding. Solenoid 258 is attached to the horizontal portion of bracket 270, as by means, e.g., of suitable screws 272, 274, and other coacting screws (not shown).

The armature of plunger 276 of solenoid 258 (FIG. 1) is adapted to be drawn into the coil of solenoid 258 in the well-known manner when solenoid 258 is energized, until the plunger shoulders or stops 278, 280 bear against the lower end of the solenoid coil.

It is to be noted that the maximum solenoid plunger travel distance is slightly greater than the movable stop travel distance necessary to bring the upper edge of the lower face 252 of movable stop 236 opposite the upper edge of the maximally leftwardly deflected horizontal link 214, whereby link 214 will contact face 252 when maximally leftwardly deflected.

Solenoid plunger 276 is fixed to the upper end of movable stop 236, as by a suitable screw 282.

Solenoid 258 is provided with energizing current by means of electrical leads of conventional type, which are not shown in FIG. 1. It is to be understood that in certain embodiments of my present invention the source of exciting current for solenoid 258 will be located within tank 13, while in other embodiments of my present invention the source of exciting current for solenoid 258 will be located outside tank 13 and the solenoid leads will pass through a wall of tank 13.

In view of the above, then, it will be seen that movable stop 236 is pulled into its upwardmost position when solenoid 258 is energized, and remains in its upwardmost position while solenoid 258 remains energized. It will also be clear to those having ordinary skill in the art, informed by the present disclosure, that solenoid 258 should be of the kind sometimes called an "impulse solenoid", the windings of which are of such low resistivity, and such heat dissipating capacity as to be capable of sustaining short bursts of high magnitude current while plunger 276 is drawn thereinto at high speed.

As further seen in FIG. 1, a cable 288 is affixed to the lower end of pivotable link 228. Cable 288 passes around a guide wheel or pulley 290, which is itself fixedly mounted within tank 13. After passing around guide wheel 290, cable 288 extends upwardly along one end wall of tank 13, and thence to a simple indicating device mounted, e.g., in the top of tank 13 (not shown).

This indicating device may, for example, be a vertically movable, upwardly spring-biased plunger the upper end of which is visible through a transparent cap protruding from the top of tank 13 when the plunger is in its uppermost position, and is not visible through said transparent cap when the plunger is in its downwardmost position. Cable 288 may be affixed to the lower end of said plunger, and thus, as will be evident to those having ordinary skill in the art, the plunger will be visible through said transparent cap only when horizontal link 214 bears against the lower step 252 of movable stop 236, i.e., when the vacuum switches 14 have been opened by means of the trip-free operating mechanism of my present invention, and will not be visible through said transparent cap when horizontal link 214 bears against the upper step 250 of movable stop 236, i.e., when the trip-free operating mechanism of my present invention is not active.

Trip-Free Circuit Breaking Operation

Referring now to FIG. 1, the above text of the present specification, and the teachings of my said prior U.S. Pat. No. 3,794,798, it will be evident to those having ordinary skill in the art that vacuum circuit breaker 11 is in its "circuit closed" position, when horizontal link 22 is in its rightmost position, with its right-hand end bearing against stop 88, as shown in FIG. 1.

It will also be evident that the three vacuum switches 14 can be opened by operating the actuating means (located outside tank 13) in such manner as to raise link 18 far enough to trip toggle mechanism 16, so that it assumes its dashed-line position (16') and in so doing drives horizontal link 22 leftwardly until it contacts fixed stop 296. At this time horizontal link 22 will be in its dashed-line position (22') wherein it will have dropped downward sufficiently to release the formerly exerted upward force on vacuum switch actuating links 82, and thus to open the vacuum switches 14.

As will now be obvious to those having ordinary skill in the electrical power system art, informed by the present disclosure and my said prior U.S. Pat. No. 3,794,798, it may be desirable under certain adverse power system operating conditions, e.g., when vacuum circuit breaker 11 is closed into a fault, to be able to open the vacuum switches 14 more quickly than can be done by means of said external actuator or actuators (i.e., the operating handle 28 and/or motor operator 26 of my said prior art U.S. patent patent).

Such adverse power system operating conditions, e.g., line-to-line or line-to-ground short circuits, often occur at locations remote from the branch distribution system circuit breakers, such as the circuit breakers of my said prior U.S. Pat. No. 3,794,798, and thus do not become evident at the location of the branch distribution system circuit breaker until after destructive results have come about. This being so, it is desirable that in some circuit breakers embodying the teachings of that patent, provision be made to open the vacuum switches thereof by means of electrical signals from the overcurrent relays which are frequently provided to monitor the conditions on such distribution systems. It will also be evident that it is desirable that these vacuum switches be opened very quickly in response to such signals from overcurrent relays, since destructive results can occur in less than a second.

It will also be evident that a motor operator of the type described in my said prior U.S. Pat. No. 3,794,798, and referred to by the reference numeral 26 therein, may not operate vacuum circuit breaker 11 quickly enough to clear major faults on its associated medium or high voltage branch distribution system before substantial damage is done, because inter alia the motor 36 thereof must complete each opening of closing operation by actuating limit switch 44 via cam 46 before the next (closing or opening) operation can take place. Thus, if a vacuum circuit breaker of the type of that patent, unprovided with a trip-free operating mechanism embodying my present invention, is closed by motor operator 26 into a major fault, this motor operator may not be able to clear this fault sufficiently rapidly to avoid damage, even if it instantly receives a fault signal from a solid-state overcurrent relay which is connected in fault detecting relation to one of the lines of the branch distribution system. This relatively slow automatic switching action results from the fact that when toggle mechanism 16 is driven but slightly beyond its center position by its associated motor operator it is very rapidly driven to its "switch closed" position (shown in solid lines in FIG. 1) by the action of its spring 75, by motor operator 26, meanwhile, continues to complete its switch closing cycle, rotating its output shaft 33 until cam 46 closes limit switch 44. Only then, can any electrical signal cause motor operator 26 to travel in its circuit opening direction, and even then toggle mechanism 16 must be driven past its neutral or central position before it acts to open the vacuum switches 14. It is to be noted that the latch means 89 of FIG. 5 of my U.s. Pat. No. 3,794,798 is not a trip-free mechanism, since link 78 must be latched and toggle 16 reset before remote triggering by latch 89 can take place.

As will now be explained, the trip-free operating mechanism of my present invention serves to provide vacuum circuit breakers of the kind shown and described in my said prior U.S. Pat. No. 3,794,798 with the ability to open very quickly in response to fault signals, such as signals provided by solid-state overcurrent relays of well-known type, independently of the states of operation of their manual operating handles or motor operators, and independently of the positions of their primary toggle mechanisms, such as toggle mechanism 16 of FIG. 1.

THE CIRCUIT BREAKING OPERATION

Let it first be assumed that vacuum circuit breaker 11 of FIG. 1 is connected between a high voltage, three-phase power source and an associated branch distribution system. Let it further be assumed that said associated branch distribution system is provided with solid-state overcurrent relays of the well-known type, and that tripping contacts of said overcurrent relays are connected in series with solenoid 258 of FIG. 1 and its energizing current source, so that solenoid 258 is energized only when said associated branch distribution system is energized via vacuum circuit breaker 11 and a fault occurs or exists on said associated branch distribution system.

If, then, vacuum circuit breaker 11 is closed into a fault existing on said associated branch distribution system, the trip-free operating mechanism embodying my present invention will respond to the resulting closure of one or more of said tripping contacts as follows:

Immediately upon being energized via said closed tripping contacts, solenoid 258 will commence to draw movable stop 236 upward, and will very rapidly draw it to its upwardmost position.

As soon as stop 236 reaches its upwardmost position, or shortly therebefore, the left-hand end of horizontal link 214 will "fall" into contact with the lower face 252 of stop 236.

As link 214 "falls" toward the lower face 252 of stop 236, its supporting links 226 and 228 pivot about their respective pivots 222 and 224, and thus link 214 not only moves leftwardly but also drops downwardly (as seen in FIG. 1), by a distance greater than the switch opening (or closing) contact travel distance of the vacuum switches 14.

This downward motion of link 214, resulting from upward motion of stop 236, is transmitted to the moving contacts of vacuum switches or contact sets 14 via links 81 and 85, horizontal link 22, and links 82; and thus, in accordance with the teachings of my present invention, the vacuum switches 14 are fully opened, within 26 milliseconds, e.g., after solenoid 258 is energized, and well before the limit switch of the motor operator associated with vacuum circuit breaker 11 has been operated by its associated cam, and the motor operator reverses and could otherwise open the vacuum switches 14, which would take approximately 300 milliseconds, e.g., altogether.

THE RESETTING OPERATION

After the circuit breaking operation just described it will, of course, be necessary to reset vacuum circuit breaker 11, i.e., to return vacuum circuit breaker 11 to the state in which the vacuum switches 14 are closed, toggle mechanisms 16 and 17 are in their stable states shown in solid lines in FIG. 1, and the trip-free operating mechanism of my present invention, comprising horizontal link 214 and movable stop 236, is in its reset position, as shown in solid lines in FIG. 1.

As explained hereinbelow, all of this is accomplished in vacuum circuit breakers embodying my present invention simply by operating the associated manual operating handle or motor operator through a complete vacuum switch opening operation and then a complete vacuum switch closing operation, so that link 18 is first raised to its upwardmost position and then depressed to its lowermost position.

As will be evident from the above description of the trip-free circuit breaking operation, toggle mechanism 16 is not reset during the trip-free circuit breaking operation, but rather remains in the stable state shown in solid lines in FIG. 1.

Thus, during the resetting operation, when link 18 has been raised by about one-half of its maximum stroke or slightly more by means of its associated operating handle or motor operator, toggle mechanism 16 will snap, by toggling action, from its solid line position designated by the reference numeral 16 to its dashed line position designated by the reference numeral 16'. During this toggling action, or snap action, coupling arm 21 will forcefully impact upon the left-hand pin 79 fixed to horizontal link 22 (as seen in FIG. 1.). As may be seen from FIG. 1, coupling arm 21 will impact upon left-hand pin 79 after it (arm 21) has passed its vertical or neutral position, and thus the impact force imparted to left-hand pin 79 will not only be leftwardly directed, but also will be upwardly directed.

This impact force acting on left-hand pin 79 causes link 22 to be thrown away from stop 88 and toward stop 296, and also produces a forcible, rapid upward movement of horizontal link 22, and thus of link 81. Since link 214 is supported by means of pivoted links 226 and 228, the force imparted by link 81 to link 214 causes link 226 to pivot about pivot 222, and thus causes link 214 to move rightwardly (as seen in FIG. 1) as well as upwardly. This rightward movement of link 214 causes the left-hand end of link 214 to rise from the lower step 252 of movable stop 236 sufficiently so that stop 236 can descend under the urging of coil spring 256 until stop 236 is in its downwardmost position, i.e., with limit stop 254 bearing upon flange 262.

After the "switch opening" stroke of link 18 is completely, then, horizontal link 22 will be in its leftmost position, bearing against stop 296, and movable stop 236 will be in its lowermost position, as shown in solid lines in FIG. 1.

Shortly thereafter, as the final part of the resetting operation, link 18 will be moved to its lowermost position, manually, or by said motor operator.

During the downward movement of link 18, toggle mechanism 16 will be tripped, via actuating arm 63, and coupling arm 21 thereof will forcibly contact the right-hand pin 79 on horizontal link 22, driving the parallelogram toggle mechanism 17 to and slightly beyond its neutral position, i.e., into its stable position shown in solid lines in FIG. 1 wherein the three vacuum switches 14 are closed.

Since, as pointed out hereinabove, coupling arm 21 is not in contact with right-hand pin 79 when vacuum circuit breaker 11 has been closed by operating link 18, horizontal link 22 is then free to drop downwardly except for the support offered by links 81 and 85. Since links 81 and 85 are mounted on horizontal link 214, their vertical position is determined by the vertical position of link 214. The vertical position of link 214 is itself determined by the limit to which links 226 and 228 can pivot about their pivots 222 and 224. As seen in FIG. 1, however, this limit is set by movable stop 236, or more particularly by the step of movable stop 236 which is presented to the left-hand end of link 214.

Since in the first step of the resetting operation, described above, movable stop 236 dropped to its lowermost position, and there remains, it follows that at the end of the second step of the resetting operation the left-hand end of link 214 will necessarily bear against the upper step 250 of movable stop 236, and that thus link 214 will be held in its upper (solid line) position, as seen in FIG. 1.

In accordance with the principles of my present invention, the linkage comprising links 82, 22, 81, 85, 214, 226, and 228 is so constructed and arranged that when link 214 bears against the high step 250 of movable stop 236, and toggle mechanism 17 is operated into its right-hand stable position, the vacuum switches 14 are held closed.

In view of the above, then, it will be seen that after vacuum circuit breaker 11 has been tripped open by means of the trip-free operating mechanism of my present invention it is only necessary to operate the associated manual or motor operator actuator means through one switch opening cycle and then through one switch closing cycle in order to close vacuum circuit breaker 11 and reset the trip-free operating mechanism of my present invention for immediate retripping.

SOLENOID ENERGIZING CURRENT SOURCE

As will be evident to those having ordinary skill in the art, informed by the present disclosure, the energizing current for solenoid 258 may be provided by any one of many conventional alternating current or direct current power supplies of suitable current rating, etc.

Equally clearly, however, it would be most desirable to provide energizing current sources for use with vacuum circuit breakers of my present invention which are cheap and compact and derive their stored energy from the high voltage power distribution systems which are protected thereby.

Further, it is desirable, though by no means obvious, that these energizing current sources should be very rapidly chargeable to their full capacities, so as to constitute very reliable means of providing solenoid operating current for tripping their associated circuit breakers, even when these breakers are closed into faults and their associated energizing current sources are not initially charged with energy.

Figure 2:
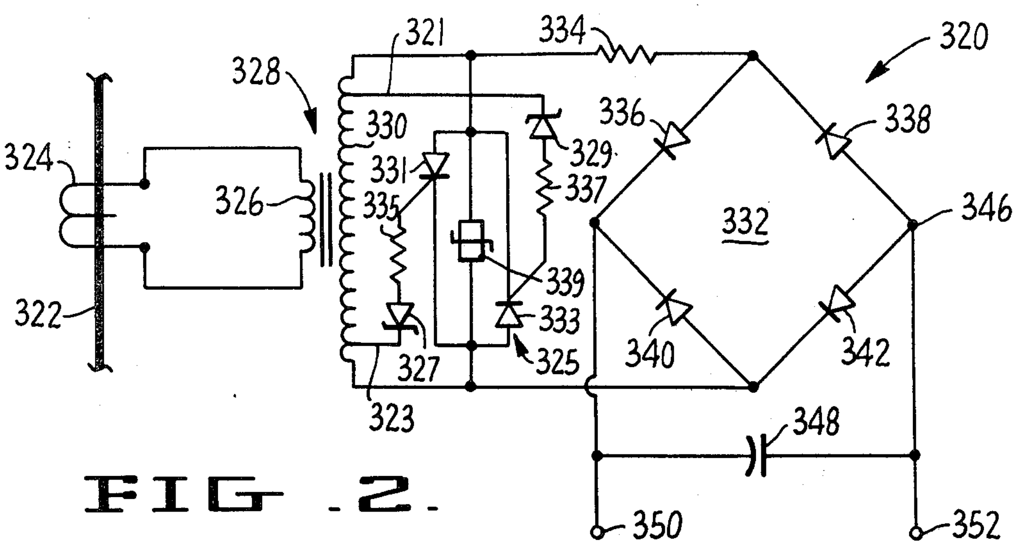
FIG. 2 is a schematic diagram of a first form of the induction-coupled stored energy device of my present invention.

Such an energizing current source, embodying my invention and adapted for use with a single phase circuit breaker, is shown in FIG. 2.

Referring to FIG. 2, it will be seen that energizing current source 320 derives its stored energy from an insulated high-voltage cable 322, which preferably is one of the cables of the distribution system protected by the circuit breaker whose tripping solenoid is applied with energizing current by source 320.

In accordance with a particular feature of my present invention, source 320 is inductively coupled to high voltage cable 322 by means of a donut-type current transformer 324, e.g., a transformer consisting of a toroidal core on which is wound a secondary winding but not a primary winding, the place of the usual primary winding being taken by the high voltage cable itself, which passes through the toroidal core.

As further seen in FIG. 2, the terminals of donut-type current transformer 324 are directly connected to the terminals of the primary winding 326 of a potential transformer 328, which serves to step up the voltage produced across the secondary, i.e., only, winding of donut-type current transformer 324. Potential transformer 328 is provided with two one turn taps 321, 323, each of which is connected to secondary winding 330 at a point spaced from one of its ends by one turn.

An overvoltage protection circuit 325, which is a particular feature of my invention, is connected across secondary winding 330, and derives control signals from taps 321 and 323.

Protection circuit 325 comprises zener diodes 327, 329, thyristors 331, 333, resistors 335, 337, and varistor 339, all interconnected as shown in FIG. 2.

Protection circuit 325 operates to protect bridge 332 and storage capacitor 348, etc., when the breaker whose tripping coil is energized by current source 320 has been closed into a fault, thus producing a large fault current in cable 322.

As capacitor 348 becomes fully charged by voltage from bridge 332, which is energized by transformers 324 and 328, current flow from transformer 328 is restricted and the corresponding output voltage alternations are characterized by high magnitude and distorted wave shape.

Said output voltage alternations are proportionately represented at taps 321 and 323, i.e., are proportionately represented across two two outer turns of winding 330.

Considering the outer turn ending at tap 323, it will be seen that this turn is connected in series with zener diode 327 and resistor 335. Zener diode 327 is so selected as to fire at a predetermined voltage, corresponding to a voltage across winding 330 which is large enough to fully charge capacitor 348 but not large enough to damage bridge 332 or capacitor 348.

When zener diode 327 fires, the resulting voltage at the control terminal of thyristor 331 triggers thyristor 331 and thus produces a short circuit across winding 330, preventing the application of destructive voltage levels to bridge 332, capacitor 348, etc.

As will be evident to those having ordinary skill in the art, the just described subcircuit comprising zener diode 327 provides protection from overvoltages across winding 330 which are of a first polarity, and the corresponding subcircuit comprising zener diode 329, and thyristor 333 provides protection from overvoltages of the opposite polarity.

In addition, varistor 339 is provided to short circuit winding 330 very rapidly in response to certain transient overvoltages which rise too quickly for said zener diode subcircuits to protect against adequately. Varistor 339 is selected to fire at a voltage slightly higher than the firing voltage of zener diodes 327 and 329.

The firing voltages of zener diodes 327, 329 and varistor 339 are such that none of them fires when the current in cable 322 is less than the full load current of the distribution system protected by the breaker whose tripping coil is energized by source 320. It is preferred that the zener diodes and the thyristors be selected to operate continuously in near full load or slight overload conditions of cable 322.

My invention is not limited to the use of the particular protection circuit shown in FIG. 2.

In a typical embodiment of my invention zener diodes 327, 329 may be RCA No. SK3397 zener diodes, thyristors 331, 333 may be International Rectifier No. 2N690 thyristors, and varistor 339 may be a General Electric No. V320LA40A varistor.

As also seen in FIG. 2, the voltage across the secondary winding 330 of potential transformer 328 is applied to a rectifying bridge arrangement 332 via a variable resistance 334. The diodes 336, 338, 340, 342 of bridges 332 will preferably be silicon diodes.

As further seen in FIG. 2, the output terminals 344, 346 of bridge 332 are directly connected across terminals of an electrolytic capacitor 348, and the output terminals 350, 352 of energizing current source 320 are also connected across, i.e., to the opposite terminals of, storage capacitor 348. As described in detail hereinbelow, the circuit breaker tripping solenoid coil to be energized by source 320, in series with a parallel set of overcurrent relay breaker tripping contacts, is connected between terminals 350 and 352 of energizing current source 320.

Figure 7:
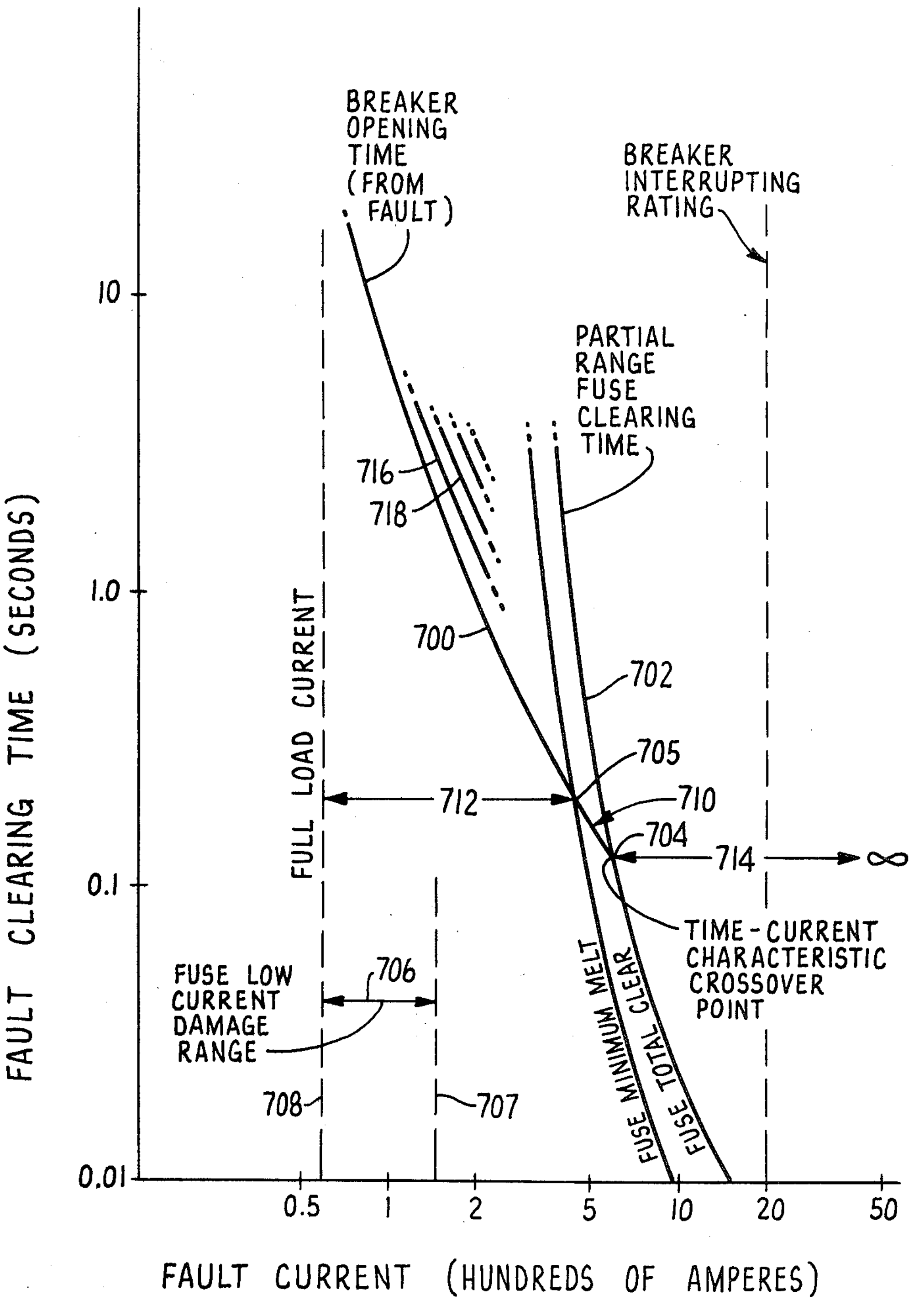
FIG. 7 is a representation of the time-current characteristic curves of a partial range fuse and a low capacity vacuum circuit breaker which may be used in combination in certain embodiments of my present invention.

In accordance with certain teachings of my present invention, donut-type current transformer 324 should be a large donut-type current transformer which is capable of giving an open circuit voltage of 220 or more volts with relatively high energy capability. Further, the resistance of the circuit of source 320 (including variable resistor 334) should be kept to a practical minimum, so that capacitor 348 will be charged from high voltage cable 322 in a very short time, which is less than the tripping time of the circuit breaker, as shown in FIG. 7. By reducing the charging time of capacitor 348 to such a low figure, source 320 becomes a very reliable means of providing tripping current to the solenoid of the associated circuit breaker, e.g., solenoid 258 of FIG. 1 hereof, so that the associated circuit breaker will reliably trip even when the breaker is closed into a fault without capacitor 348 being initially charged at all. For optimum reliability, the single storage capacitor in an n-phase system should be charged through a single rectifying system, which is energized by n donut current transformers, one in each phase. At the same time, however, resistance 334 and the components of protection circuit 325 must be so selected that no destructive effects, such as burnout of diodes 336, 338, 340, 342 occur when capacitor 348 is charged. The selection of variable resistance 334, etc. may be done experimentally by one having ordinary skill in the art without the exercise of invention.

Figure 3:
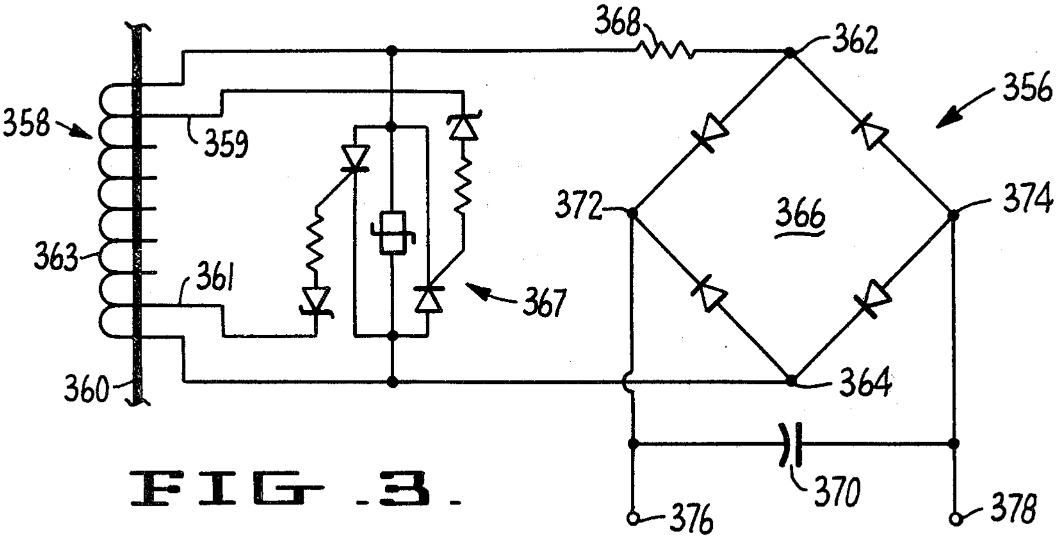
FIG. 3 is a schematic diagram of a second form of the induction-coupled stored energy device of my present invention.
Figure 6:
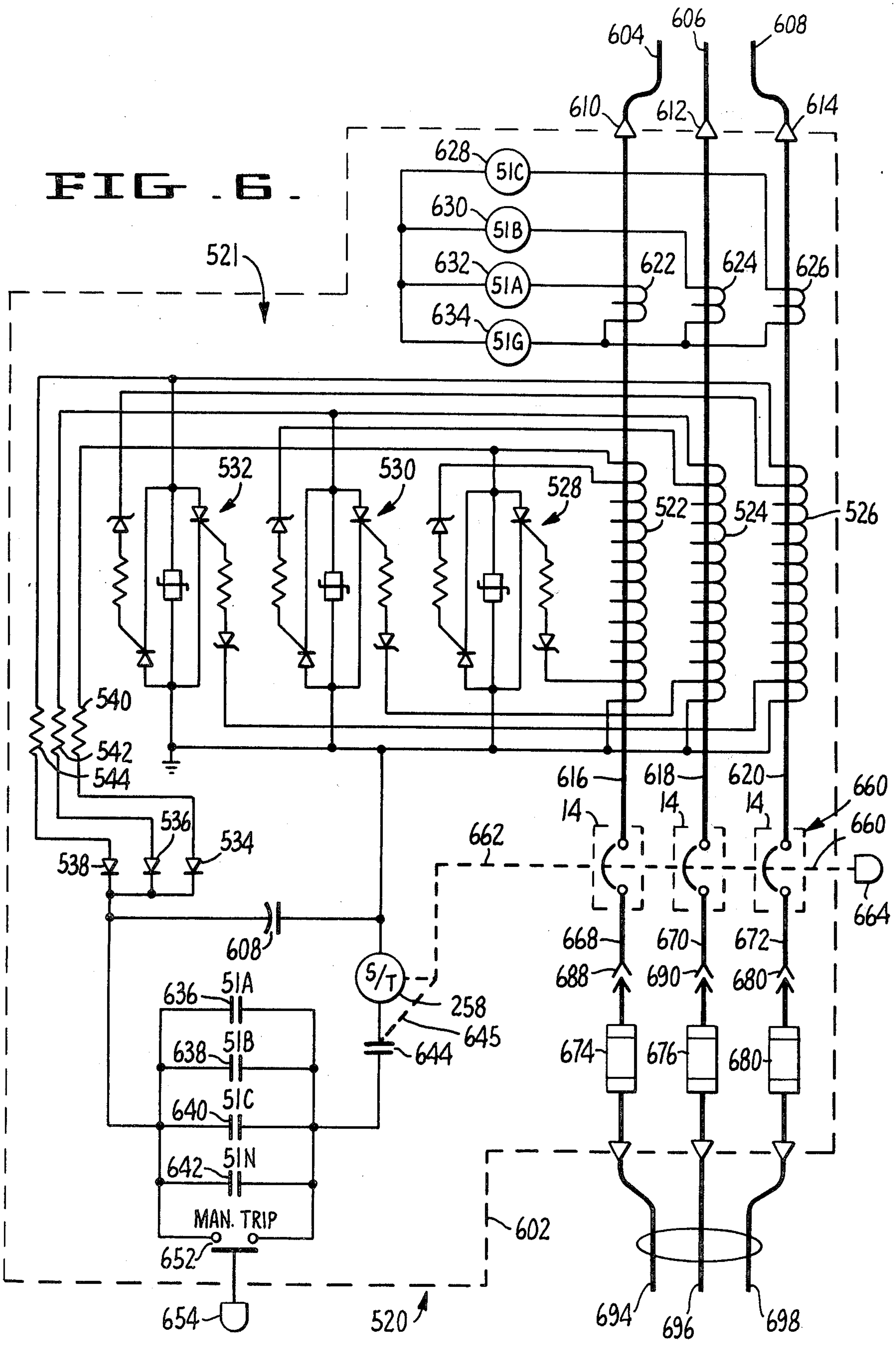
FIG. 6 is a schematic diagram of a second form of the high voltage short circuit protection system of my present invention.

It is also contemplated as part of my present invention that in some applications thereof it will be possible to so design the energizing current source that the small potential transformer will be unnecessary. Such an alternative embodiment of the energizing current source of my invention is shown in FIGS. 3 and 6. In FIG. 3 the doubly-tapped donut-type current transformer 358 is inductively coupled to the high voltage cable 360, and is connected across the input terminals 362, 364 of a rectifying bridge 366 via a resistor 368. Transformer 358 will in general be selected in the same manner as transformer 324 of FIG. 2, and the winding 363 thereof may have about 15 to 20 turns; each of its taps 359, 361 being connected to it at a distance of one turn from one of its ends. In the manner of the embodiment of FIG. 2, the storage capacitor 370 of the embodiment of FIG. 3 is connected across the output terminals 372, 274 of bridge 366, and the output terminals 376, 378 of source 356 are connected to the terminals of storage capacitor 370.

Overcurrent protection circuit 367 is similar to protection circuit 325 of FIG. 2 in structure and mode of operation.

One of the principal advantages of this aspect of my present invention results from the fact that at high distribution voltages, such as 25 or 35 kilovolts, a donut-type current transformer installed around a single cable of a high voltage distribution system is extremely inexpensive as compared to a fused potential transformer.

Another advantage of this aspect of my present invention results from the fact that in the energizing current source circuits of my present invention, such as the circuits of FIGS. 2 and 3, the donut-type current transformer operates into a high impedance load once the storage capacitor is charged, and the overvoltage protection circuit is essentially the only device requiring energy from the system.

It is to be particularly noted that while the induction-coupled stored energy devices of my present invention for use in high voltage circuits, such as the devices of FIGS. 2 and 3, are very useful for the purpose of providing energizing current for the solenoids of the vacuum circuit breakers of my present invention, the induction-coupled stored energy devices of my present invention are not limited to use in this application. To the contrary, the induction-coupled stored energy devices of my present invention may serve many purposes in high voltage electrical power networks, and take many corresponding forms.

Figure 4:
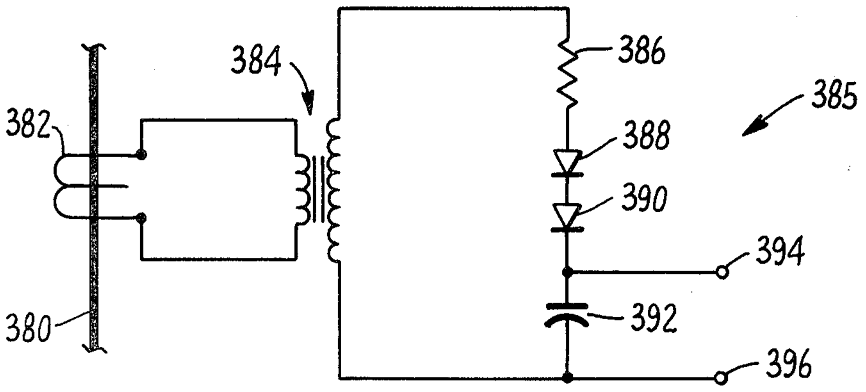
FIG. 4 is a schematic diagram of a third form of the induction-coupled stored energy device of my present invention.

For example, an induction-coupled stored energy device embodying my present invention in which extremely short charging time is not critical is shown in FIG. 4.

The induction-coupled stored energy device of my present invention shown in FIG. 4 is inductively coupled to an insulated high voltage cable 380 by means of a donut-type current transformer 382, similar to a General Electric type JCHO transformer rate at 100/5 amps and costing less than $50. The potential transformer 384 of the embodiment of FIG. 4 may be a small 225-volt-to-6-volt potential transformer rated at approximately 10 volt-amperes, as used, e.g., on an oil-tight transformer-type indicating light.

As further seen in FIG. 4, the induction-coupled stored energy device 385 shown therein further comprises, in series, a resistor 386, a pair of diodes 388, 390, and a storage capacitor 392 across which are connected the output terminals 394, 396 of the induction-coupled stored energy device 385. Resistor 386 may be a high wattage 3 kilohm resistor; diodes 388, 390 may be silicon diodes; and capacitor 392 may be an electrolytic capacitor. In the circuit arrangement shown in FIG. 4, the 225 volt secondary winding of potential transformer 384 reflects a high impedance back to current transformer 382, causing the transformer iron thereof to saturate at very low primary currents, and giving an output voltage that is pulsed at an approximately constant peak value over a wide range of primary current inputs. With the circuit shown in FIG. 4, having the component values given above, capacitor 392 charges rapidly to its full charge of 450 volts.

It is to be understood that many modifications of the simple circuit of FIG. 4 fall within the scope of my present invention, such as changing the ratio of transformer 384, or the values of resistance or capacitance, 386, 392, to vary the amount of useful energy stored in storage capacitor 392. My present invention embraces any such combination in which a simple, inexpensive current transformer is used to tap useful control power from high voltage power cables without the need for expensive high voltage potential transformers, with or without high voltage fuses, and high voltage cable terminations.

Further, within the scope of my present invention current transformer 382 may be of the clamp-on type, in which case the circuit of FIG. 4 may be applied to existing high voltage cables for tapping energy therefrom without distrubing existing connections. In some applications of this aspect of my present invention the storage capacitor may be replaced with a storage battery, and this circuit may be used to trickle-charge that battery.

Figure 5:
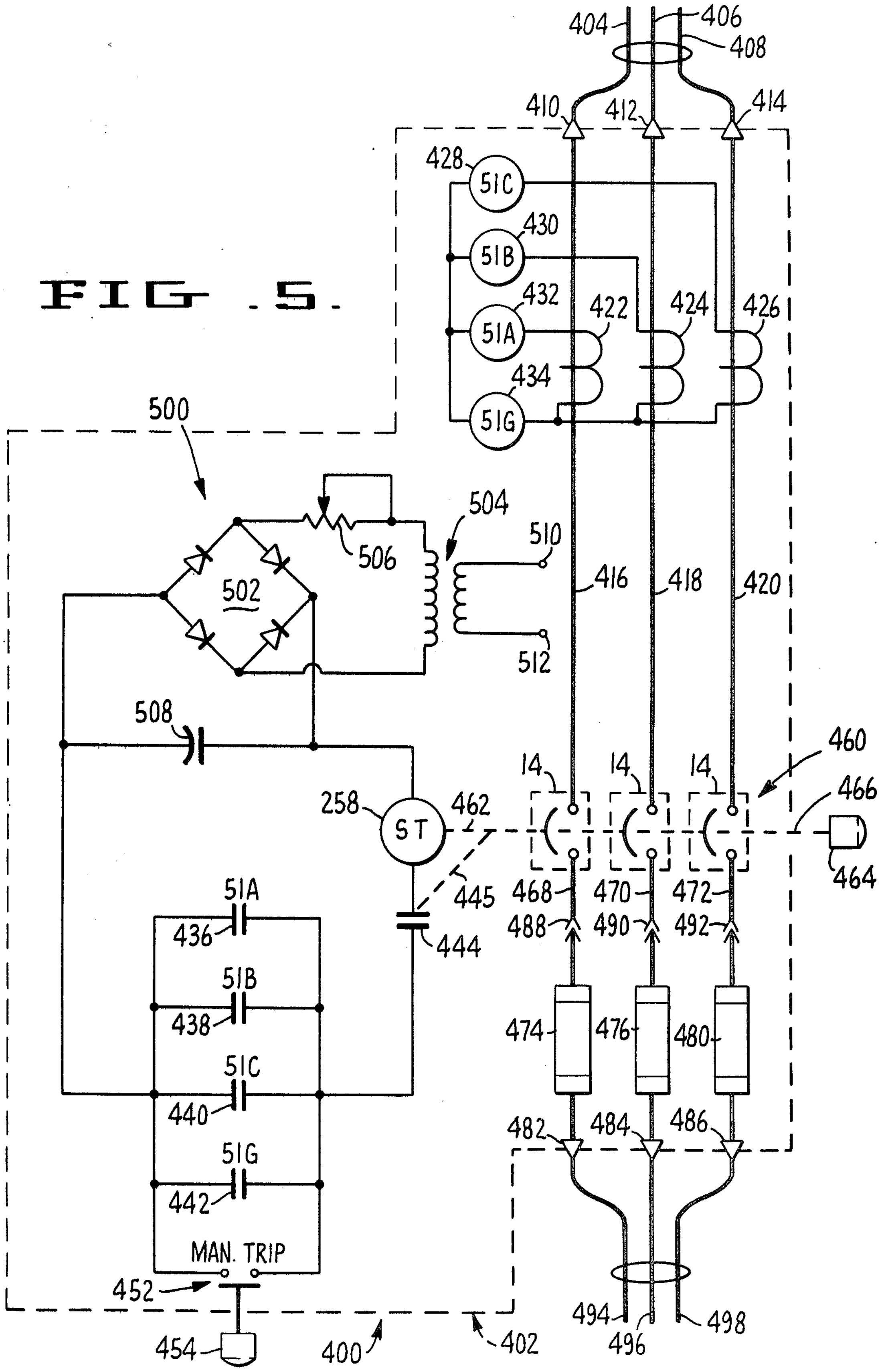
FIG. 5 is a schematic diagram of a first form of the high voltage short circuit protection system of my present invention.

Referring now to FIG. 5, there is shown a short circuit protection system 400 embodying certain principal features of my present invention. Short circuit protection system 400 is adapted to provide short circuit protection on utility high voltage distribution systems, and particularly underground systems requiring "total dead front" equipment.

A particularly advantageous field of application of short circuit protection systems embodying these principal features of my present invention, such as short circuit protection system 400, is constituted by the now well-known 24.9 kilovolt and 34.5 kilovolt distribution systems, for which full range, oil-immersed fuses of ample continuous current carrying ability are not readily available.

As will be explained in detail hereinbelow, short circuit protection system 400 comprises a trip-free vacuum circuit breaker embodying certain principal features of my present invention, as shown, e.g., in FIG. 1 and described hereinabove in connection therewith, in series with partial range oil immersible current limiting fuses.

Partial range current limiting fuses are current limiting fuses which do not have the ability to interrupt all of the fault currents which will melt their fusible links, cf., characteristic curve 702 in FIG. 7. More particularly, partial range current limiting fuses are current limiting fuses which are unable to successfully clear low fault currents the magnitudes of which fall in or slightly above their overload current thresholds. Partial range current limiting fuses are currently available which have continuous current carrying capacities of approximately 200 amperes when connected in parallel.

Trip-free vacuum circuit breakers embodying my present invention, e.g., as described hereinabove in connection with FIG. 1, are trip-free oil immersed mechanisms which can safely be closed into high current faults either manually or by means of a motor operator. They comprise trip-free vacuum switch operating mechanisms which are a principal feature of my present invention, and which allow the breaker contacts of the trip-free vacuum circuit breakers of my invention to be opened by solenoid tripping immediately after being closed into faults. In the short circuit protection systems of my present invention the tripping solenoids are energized by energizing currents controlled by solid state overcurrent relay systems which sense fault currents in the protected high voltage distribution systems.

The solid state overcurrent relays of these solid state overcurrent relay systems are themselves oil immersible, as I have determined by actual testing over a period of time.

In accordance with a principal feature of my present invention, the power for operating these solid state overcurrent relays in certain preferred embodiments of my present invention, and for energizing the tripping solenoid coils in the vacuum circuit breakers of these preferred embodiments, is obtained from induction-coupled stored energy devices of my present invention, such as those shown in FIGS. 2, 3, and 6 hereof and described in connection therewith. The induction-coupled stored energy devices employed in these preferred trip-free vacuum circuit breaker embodiments of my present invention will be so constructed and arranged, by those having ordinary skill in the art, informed by the present disclosure, that a full charge of solenoid tripping energy can be stored on the storage capacitors thereof during the short period of time between the closing of the trip-free vacuum circuit breakers into a fault and the need to trip them, as evidenced by the closing of at least one of the overcurrent relay contacts connected in the tripping solenoid energizing circuits.

The short circuit protection systems of my present invention, such as short circuit protection system 400, will sometimes herein be called "extended range short circuit protection systems", because these systems are capable of interrupting their protected circuits over greater current magnitude ranges than the ranges of currents which will blow the fuses incorporated in these systems. The extension of the interrupting current magnitude range in these systems is provided by the trip-free vacuum circuit breakers of my present invention, along with the overcurrent relays, which are incorporated in these systems.

Thus, it will be seen that in the extended range short circuit protection systems of my present invention the overcurrent relays of these systems will trip the vacuum circuit breakers of these systems over the low fault current magnitude range in which the current limiting fuses of these systems are incapable of sufficiently rapidly interrupting the protected circuits; and that the current limiting fuses of these systems will serve to interrupt the protected circuits, i.e., will "blow", when fault currents in the protected circuits are of greater magnitude than the maximum current values of said low fault current magnitude range.

The solid state overcurrent relays which are incorporated in the extended range short circuit protection systems of my present invention are of the type which permit adjustment of their time-current characteristics, or can be selected to have particular desired time-current characteristics. Thus, the solid state overcurrent relays used in the extended range short circuit protection systems of my present invention permit better coordination with backup circuit breakers than could be obtained with current limiting fuses alone, and at the same time make these systems "full range clearing".

The current limiting fuses employed in the extended range short circuit protection systems of my present invention permit the use in those systems of vacuum circuit breaker contacts which have relatively low fault interrupting capacity, and thus are quite economical.

Thus, it will be seen by those having ordinary skill in the electrical switchgear art, informed by the present disclosure, that the particular combinations of circuit breakers and current limiting fuses which are selected and interconnected in accordance with the teachings of my present invention provide extended range short circuit protection systems characterized by full range fault protection, very high interrupting capacity, and extremely good system coordination characteristics, at higher continuous current than is currently available in full range fusing above 15 kilovolts in rating.

It will also be seen that the use of induction-coupled stored energy devices embodying certain features of my present invention in the short circuit protection systems of my present invention permits operating energy to be supplied to these systems much more economically, and by means of much less bulky equipment, than would be the case if the operating energy for such systems were supplied by means of fused potential transformers. It is to be understood, however, that certain short circuit protection systems incorporating particular features of my present invention, but not incorporating induction-coupled stored energy devices of my present invention, fall within the scope of my present invention.

It is further to be understood that in certain preferred forms of the short circuit protection systems of my present invention the current limiting fuses thereof are oil immersed, and are mounted in Trayer Universal Fuse Wells such as those shown and described in my U.S. Pat. No. 4,170,000, which was issued on Oct. 2, 1979.

Yet further, in certain preferred forms of the short circuit protection systems of my present invention all of the components thereof are immersed in a common body of transformer oil contained in a single tank. In other preferred forms of my present short circuit protection system invention, by contrast, the induction-coupled stored energy devices may be located outside the oil filled tank which contains all of the other components of the system.

In any event, it will be evident to those having ordinary skill in the art, informed by the teachings of my said U.S. Pat. No. 4,170,000, that the current limiting fuses of these short circuit protection systems of my present invention will be quite readily accessible should they need changing. As noted hereinabove, the trip-free vacuum circuit breaker mechanisms of my present invention are quite easily reset by manually operating the operating handle through a switch opening stroke, and then through a switch closing stroke, or by operating the operating handle through said strokes by means of a motor operator of the kind shown and described in my said U.S. Pat. No. 3,794,798. This motor operator can be remotely operated, provided a source of operating voltage is available.

It is further to be understood that the term "fuse" as used herein in describing short circuit protection systems of my present invention is not limited to single fuses, but rather in some cases also embraces combinations of fuses. Thus, in a particular embodiment of my short circuit protection system invention each "fuse" is a combination of two 65 amp current limiting fuses connected in parallel in a Trayer Universal Fuse Well, as shown, e.g., in FIG. 8 of my pending U.S. patent application Ser. No. 79,485. In another embodiment of a short circuit protection system of my present invention each "fuse" is a parallel combination of four current limiting fuses mounted in a Trayer Universal Fuse Well.

It is also to be noted that in accordance with a principal feature of my present invention it is particularly advantageous to make use in short circuit protection systems of my present invention of overcurrent relays of the type which permit selection among various time-current characteristics, such as "inverse" "very inverse", "extremely inverse", etc., and have different available current taps.

As will be evident to those having ordinary skill in the art, informed by the present disclosure, short circuit protection systems embodying my present invention, e.g., as described immediately hereinabove, and also as disclosed in detail hereinafter, lend themselves to sensitive ground overcurrent relaying to an extent not available with simple fused equipment.

Referring again to FIG. 5, it will be seen that short circuit protection system 400, embodying certain particular teachings of my present invention, comprises a tank 402 in which all of the other principal elements of short circuit protection system 400 are contained. Tank 402 is an electrical equipment tank of well known type, which type embraces tank 13 hereof and the electrical equipment tanks shown and described in my above-cited U.S. patents and patent application.

In the well known manner, tank 402 is substantially completely filed with transformer oil, or at least sufficiently so as to cover all of said principal elements, it being understood that the terms "all other principal elements" does not embrace the high voltage bushings which provide external circuit connections through the walls of tank 402.

As will be understood by those having ordinary skill in the electrical switchgear art, informed by the present disclosure, short circuit protection system 400 is interposed in a three-phase electrical power line between a three-phase high voltage source (not shown) and a three-phase high voltage load (not shown). The three-phase high voltage cable segments 404, 406, 408 shown in FIG. 5 are the end segments of high voltage cables extending from said three-phase high voltage source to three high voltage bushings 410, 412, 414 which in the well known manner are mounted in and provide insulated circuit connection through a wall, e.g., the top, of tank 402. As will also be evident to those having ordinary skill in the art, informed by the present disclosure, the short circuit protection system of my present invention will also find application in single phase systems, and in general in n-phase systems.

As will be apparent to those having ordinary skill in the art, each bushing 410, 412, 414 may, for example, be a bushing well of the type referred to by the reference numeral 56 in my said U.S. Pat. No. 4,170,000; in which case each cable segment 404, 406, 408 will be terminated in a plug or connector of the kind referred to by the reference numeral 64 in my said U.S. Pat. No. 4,170,000, into which is inserted a bushing insert of the kind referred to by the reference numeral 66 in my said U.S. Pat. No. 4,170,000. Thus, when the said connectors in which cable segments 404, 406, 408 are terminated are properly engaged in their respective associated bushings, i.e., bushing wells, 410, 412, 414, the internal conductors 416, 418, 420 located within tank 402 will be directly, conductively connected to the conductors of the cables terminating in segments 404, 406, 408, and at the same time insulated from the walls of tank 402.

As further seen in FIG. 5, tank 402 contains a solid state overcurrent relay system comprising three donut-type current transformers 422, 424, 426; relay coils 428, 430, 432, 434; and relay contact sets 436, 438, 440, and 442. The solid state overcurrent relay consisting of these and other parts will be generally referred to herein by the reference numeral 450.

As indicated by the corresponding legends 51A—51A, 51B—51B, 51C—51C, and 51G—51G, it will be understood by those having ordinary skill in the art, in accordance with well established standard convention, that relay coil 432 closes normally open contact set 436 when energized; relay coil 430 closes normally open contact set 438 when energized; etc.

As also seen in FIG. 5, current transformer 422, which is series connected with relay coil 432, is linked with conductor 416; current transformer 424, which is series connected with relay coil 430, is linked with conductor 418; and current transformer 426, which is series connected with relay coil 428, is linked with conductor 420.

As will be understood by those having ordinary skill in the art, informed by the present disclosure, solid state overcurrent relay 450 is so constructed and arranged, in the manner well known to those having ordinary skill in the electrical switchgear art, that the occurrence of a fault current exceeding the predetermined time-current characteristics of relay 450 in one of the conductors 416, 418, 420, or their associated ground connection, will result in the closing of a corresponding set of relay contacts 436, 438, 440, 442, or several of them. For example, a suitable fault current in conductor 416 will thus result in the closing of relay contact set 436; a suitable fault current in conductor 420 will result in the closing of relay contact set 440.

Tank 402 further contains a contact set 444, which opens when the hereinafter described circuit breaker 460 of circuit protection system 400 opens, thereby protecting the solenoid 258 of circuit breaker 460 from overcurrent damage. The provision of linkage means 445 to close contact set 444 when said circuit breaker closes is within the scope of one having ordinary skill in the art, without the exercise of invention.

As further seen in FIG. 5, a manually operable switch 452 is connected in parallel with said relay contact sets 436, 438, 440 and 442, and is provided with a manually operable actuator 454 whereby it can be manually closed by a human operator from outside tank 402. As will be evident to those having ordinary skill in the electrical switchgear art, informed by the present disclosure, the closing of switch 452 will result in the tripping, and opening, of circuit breaker 460 of circuit protection system 400 if energizing power is then being supplied to circuit protection system 400. Means for fluid-tightly passing the stem of actuator 454 through a wall of tank 402 will be provided by those having ordinary skill in the art without the exercise of invention. Alternatively, switch 452 and actuator 454 may both be located outside tank 402, and switch 452 connected across the relay contact sets by means of conductors passing through bushings mounted in a wall of tank 402.

Referring again to FIG. 5, it will be seen that tank 402 contains a circuit breaker, which will generally be referred to herein by the reference numeral 460. In the preferred embodiment of my present short circuit protection system invention shown in FIG. 5 circuit breaker 460 will be a trip-free vacuum circuit breaker of the kind shown in FIG. 1 hereof and described herein in connection therewith.

Circuit breaker 460, then, will be considered to be the trip-free vacuum circuit breaker mechanism shown within tank 13 in FIG. 1 hereof, excepting the connectors connected to the terminals of vacuum switches 14 and their associated bushings. This mechanism, rather than being disposed within its own separate tank 13, will be immersed in the transformer oil in tank 402.

For clarity of illustration, only the three vacuum switches 14 and the tripping solenoid 258 of circuit breaker 460 are shown in FIG. 5. The mechanical interconnection between solenoid 258 and the vacuum switches 14 is schematically indicated by dashed line 462.

It is to be understood, however, that circuit breaker 460 in FIG. 5 is substantially identical to circuit breaker 11 of FIG. 1, with the exceptions noted above.

Thus, circuit breaker 460 comprises a toggle operating mechanism, a first toggle mechanism, a second toggle mechanism, a first operating link, an externally actuable actuator for said first operating link, a horizontal link coacting with a movable stop which is driven by solenoid 258, etc., all of which are substantially identical to the parts of circuit breaker 11 having the same names, and the corresponding reference numerals 12, 16, 17, 18, 214, and 236. The manual or motor operated actuator for the equivalent in FIG. 5 of operating link 18 of FIG. 1 will be identified herein by the reference numeral 464, and the corresponding internal mechanism including the equivalent of operating link 18 will be identified herein by the reference numeral 466. The equivalent of cable 288 and its associated indicating device are not known in FIG. 5 for clarity of illustration, but will be provided in preferred embodiments of the short circuit protection system of FIG. 5.

As seen in FIG. 5, each of the conductors 416, 418, and 420 is connected to a terminal of an associated one of the vacuum switches 14. The terminal of each vacuum switch 14 which is not connected to one of the conductors 416, 418, 420 is connected to one of the three conductors 468, 470, 472.

Referring again to FIG. 5, it will be seen that three current limiting fuses 474, 476, 480 are mounted within tank 402.

In the preferred embodiment of my present invention which is schematically shown in FIG. 5, each current limiting fuse 474, 476, 480 is mounted in a Trayer Universal Fuse Well of the kind shown and described in my said U.S. Pat. No. 4,170,000. Thus, the bushing symbols 482, 484, 486 shown in FIG. 5 each correspond to a bushing well substantially identical to the bushing well 56 shown in FIG. 3 of my said U.S. Pat. No. 4,170,000.

The symbols 488, 490, 492 in FIG. 5 represent the respective extensions secured to the lower ferrules of fuses 474, 476, 480 in accordance with the teachings of my said U.S. Pat. No. 4,170,000, a substantially identical extension being identified by the reference numeral 18 in that patent, and the contact strips which coact with said extensions in accordance with the teachings of that patent, the contact strip shown in that patent being identified by the reference numeral 136.

As further seen in FIG. 5, each of the conductors 468, 470, 472 is connected to the contact block of one of said three Trayer Universal Fuse Wells each containing one of the current limiting fuses 474, 476, 480 in the manner in which flexible lead 140 of said U.S. Pat. No. 4,170,000 is connected to contact block 82 thereof.

For clarity of illustration, no further showing of the Trayer Universal Fuse Wells containing fuses 474, 476, 480 is made in FIG. 5.

Referring again to FIG. 5, it will be seen that three cable end segments 494, 496, 498 are connected, respectively, to bushings 482, 484, and 486, e.g., by means of connectors and bushing inserts substantially identical to the connectors 64 and bushing inserts 66 shown and described in said U.S. Pat. No. 4,170,000. Cable end segments 494, 496, 498 are the ends of the cables of a three-phase power line extending from short circuit protection system 400 to said three-phase high voltage load, e.g., a typical branch power line and the power consuming devices supplied by it.

Referring again to FIG. 5, it will be seen that the energizing current for tripping solenoid 258 is supplied by an energy source 500, which comprises a rectifier bridge 502, a potential transformer 504, a variable resistor 506, and a capacitor 508. The terminals 510, 512 of the primary winding of potential transformer 504 are connected to a local or remote source of potential which is capable of providing transformer exciting voltage even when circuit breaker 460 is open, in order to assure that a full quantity of circuit tripping energy will be available immediately after circuit breaker 460 is closed into a fault As will be evident to those having ordinary skill in the art, informed by the present disclosure, transformer 504 will in some cases necessarily be a voltage adjusting transformer, to change the voltage supplied to its primary winding to a voltage of sufficient magnitude to charge capacitor 508 to the direct current trip potential required to operate solenoid 258.

The selection of suitable rectifiers for rectifier bridge 502, and a suitable energy storage capacitor 508, and suitable resistor 506, is within the scope of one having ordinary skill in the electrical switchgear art, informed by the present disclosure.

As pointed out above, combinations of particular overcurrent relays, current limiting fuses, and vacuum circuit breaker contact assemblies may be selected for use in short circuit protection systems of my present invention, such as that shown in FIG. 5, which give full range short circuit protection while at the same time permitting the use of vacuum circuit breaker contacts which have relatively low fault interrupting capacity, and thus are quite economical, and also yielding extremely good system coordination characteristics at higher continuous current than is available in full range fusing above 15 kilovolts in rating.

In the embodiment of FIG. 5, for example, overcurrent relay system 450 comprises three ITE 51E "extremely inverse" solid state overcurrent relays 428, 430, 432 with their 4 ampere taps sensing each phase and one ITE 51E 434 with its 1.5 ampere tap sensing "residual" current of the three 200/5 ampere current transformers 422, 424, 426. Each current limiting fuse 474, 476, 480 comprises four B&S 65 ampere current limiting fuses connected in parallel in a Trayer Universal Fuse Well (U.S. Pat. No. 4,170,000); and the load break vacuum contacts 14 are rated at 2000 to 4000 amperes interrupting capacity. The maximum continuous rating of this short circuit protection system of my present invention is 195 amperes.

In a variant of the embodiment of FIG. 5, the overcurrent relay tap sensing each phase is the 1.5 ampere tap, and each current limiting fuse is a single 65 ampere current limiting fuse. The continuous current rating of this variant of the short circuit protection system of FIG. 5 is 65 amperes.

As will now be apparent to those having ordinary skill in the art, informed by the present disclosure, the embodiment of my present invention shown in FIG. 5 operates as follows.

The high voltage three-phase load connected to bushings 482, 484, 486 is energized when actuator 464 is manipulated to close the vacuum switches 14.

Thereafter, when a fault occurs in the high voltage three-phase load or the three-phase line including cable segments 494, 496, 498, it is detected by overcurrent relay 450, and one or more of the overcurrent relay contact sets 436, 438, 440, 442, are closed.

Upon the closing of one or more of these relay contact sets the solenoid energizing circuit is completed through energy storage capacitor 508, the closed relay contact or contacts, protective contact set 444, and solenoid tripping coil 258.

The energization of tripping solenoid coil 258 results in the substantially immediate opening of the vacuum switches 14, as explained hereinabove in connection with FIG. 1, and the fault is cleared. Once the fault has been corrected circuit breaker 460 can be reset, and thus short circuit protection system 400 can be reset, merely by operating the actuator 464 through a full stroke in its circuit opening direction, and then through a full stroke in its circuit closing direction.

Referring now to FIG. 6, and comparing the same with FIG. 5, it will be seen that certain ones of the structural details of short circuit protection system 520 of FIG. 6. are substantially identical to corresponding structural details of the short circuit protection system 400 of FIG. 5.

For this reason, the convention is adopted herein of designating each part of the short circuit protection system 520 of FIG. 6 which is substantially identical to a corresponding part of the short circuit protection system 400 of FIG. 5 by the reference numeral applied to the corresponding part of the short circuit protection system 400 of FIG. 5 arithmetically augmented by the constant 200. Thus, the relay coils 628, 630, 632, and 634 of FIG. 6 will be seen to be substantially identical to the relay coils 428, 430, 432, and 434 of FIG. 5; the fuses 674, 676, 680 of FIG. 6 will be seen to be substantially identical to the fuses 474, 476, 480 of FIG. 5; etc.

As will be evident from the above disclosure, the solenoid coil 258 and the current limiting fuses 14 of FIG. 6 are substantially identical to the solenoid coil and current limiting fuses of FIG. 5 having the same reference numerals.

Referring now to FIG. 6, it will be seen that the principal difference between the short circuit protection system of FIG. 5 and the short circuit protection system of FIG. 6 lies in their respective energy sources 500 and 521.

While energy source 500 of FIG. 5 is a conventional capacitor trip system, the energy source 521 of FIG. 6 is a three-phase induction-coupled stored energy device embodying my present invention. In general, energy source 521 is a three-phase version of the single-phase energy storage device or energizing current source 320 of FIG. 2, in which the rectifier bridge is replaced by a three-phase, half wave rectifying system.

Thus, energy source 521 of FIG. 6 comprises three doubly-tapped donut-type current transformers 522, 524, 526, each of which is similar to current transformer 358 of FIG. 3.

As seen in FIG. 6, each doubly-tapped donut-type current transformer 522, 524, 526 is inductively coupled to and derives energy from an associated conductor 616, 618, 620. The voltages produced by donut-type current transformers 522, 524, 526 are limited in peak magnitude by protection circuits 528, 530, 532, and applied to the rectifier system comprising rectifiers 534, 536, 538, via resistors 540, 542, 544, to charge energy storage capacitor 608.

The advantages of employing an induction-coupled stored energy device of my present invention as the solenoid energizing current source in a short circuit protection system embodying my present invention will be clear from the above disclosure of my induction-coupled stored energy device invention. It suffices to point out here that the use of an induction-coupled stored energy device of my present invention in the short circuit protection system of FIG. 6 makes it possible, without the use of an auxiliary solenoid energizing power source, to close circuit breaker 660 into a fault and have that fault cleared before substantial, or indeed any, equipment damage is done.

As will be evident to those having ordinary skill in the art, informed by the present disclosure, protection circuits 528, 530, and 532 are similar to and operate in the mode of protection circuits 325 and 367.

Referring now to FIG. 7, there is shown a representation of the time-current characteristics of a low capacity vacuum circuit breaker and a partial range fuse such as are used in the embodiments of my present invention shown in FIGS. 5 and 6. For example, a vacuum circuit breaker having the time-current characteristic 700 of FIG. 7 might be used as the vacuum circuit breaker 660 of FIG. 6, and partial range fuses having the total clear time-current characteristic 702 of FIG. 7 might then be used as the partial range fuses 674, 676, 680 of FIG. 6.

As shown by the fuse total clear characteristic curve 702 of FIG. 7, a partial range fuse, as the term is used herein, is a fuse which cannot clear fault currents down to the full load current magnitude of the distribution system which the fuse is connected to protect. In other words, a partial range fuse is characterized by a "low current damage range" (706, FIG. 7), over which the fuse link does not melt quickly but rather other parts of the fuse become heated and are damaged, and overcurrent damage is sustained by the distribution system which the fuse is connected to protect.

In accordance with a particular feature of my present invention, the fault current magnitude corresponding to the intersection or crossover point 704 of the time-current characteristics 700 and 702 is less than the interrupting rating of the breaker having the time-current characteristic 700 and greater than the maximum current 707 of the low current damage range 706 of the partial range fuse having the time-current characteristic 702. The fault current range over which either the vacuum circuit breaker or the partial range fuse alone can protect said distribution system will sometimes be called the "common protection range" 710, and is the segment of characteristic curve 700 extending from point 704 to point 705.

The full load current line 708 of FIG. 7 represents the full load rating of said distribution system. As seen in FIGS. 5 and 6, said distribution system may actually be protected by a plurality of partial range fuses and a vacuum circuit breaker comprising a corresponding plurality of vacuum contacts 14, when it is a multi-phase system.

The time corresponding to crossover point 704 represents the maximum time allowed for the storage capacitor to become fully charged when the breaker is closed into a fault during the operation of a distribution system protected by an embodiment of my invention.

The fault current range 712 of FIG. 7 is the fault current range over which the breaker only clears the circuit in the event of a fault producing a fault current lying within that range. Over the fault current range 714 of FIG. 7, only the fuse clears the circuit in the event of a fault producing a fault current lying within that range.

Characteristic curves 716, 718, etc., shown only in part correspond to other ITE Model 51 relay time lever settings, all of which fall within the scope of preferred embodiments of my present invention.

It will thus be seen that the objects set forth above, among those made apparent from the preceding description, are efficiently attained, and since certain changes may be made in the above constructions and the methods carried out thereby without departing from the scope of the present invention it is intended that all matter contained in the above description or shown in the accompanying drawings shall be interpreted as illustrative only, and not in a limiting sense.

It is also to be understood that the following claims are intended to cover all of the generic and specific features of the invention herein described, and all statements of the scope of the invention which, as a matter of language, might be said to fall therebetween.

What I claim is:

1. A short circuit protection system for a high voltage alternating current distribution system, comprising:
  current limiting fuse means adapted to be connected in circuit in a high voltage power line extending between said high voltage alternating current distribution system and a source of high voltage alternating current power;
  vacuum circuit breaker means, including solenoid-operated tripping means, adapted to be connected in series with said current limiting fuse means between said distribution system and said source of power;
  overload current detecting means for detecting fault currents in said distribution system and providing a tripping signal to trip said vacuum circuit breaker means;
  winding means inductively coupled to at least one conductor of said power line and insulated from said power line;
  rectifying means for rectifying an alternating current voltage derived from said winding means and producing a unidirectional current;
  electrical energy storage means for storing electrical energy derived from said uni-directional current; and
  circuit means for energizing the solenoid means of said solenoid-operated tripping means from said electrical energy storage means under the control of said overload current detecting means.

2. A short circuit protection system as claimed in claim 1 in which neither said current limiting fuse means for said vacuum circuit breaker means alone is capable of protecting said distribution system from overcurrent damage over the complete range of fault current magnitudes extending from the full load rating of said distribution system to the maximum current rating of said current limiting fuse means.

3. A short circuit protection system as claimed in claim 2 in which said current limiting fuse means, said vacuum circuit breaker means and said overload current detecting means are all immersed in an insulating fluid.

4. A short circuit protection system as claimed in claim 3 in which said insulating fluid is contained in a single tank.

5. A short circuit protection system as claimed inn claim 1 in which said current limiting fuse means, said vacuum circuit breaker means and said overload current detecting means are all immersed in an insulating fluid.

6. A short circuit protection system as claimed in claim 5 in which said insulating fluid is contained in a single tank.

7. A short circuit protection system as claimed in claim 5 in which said fault current detecting means comprise solid state overcurrent relay means, and said solid state overcurrent relay means are immersed in said insulating fluid.

8. A short circuit protection system as claimed in claim 7 in which said insulating fluid is contained in a single tank.

9. A short circuit protection system for a high voltage alternating current distribution system, comprising:
  current limiting fuse means adapted to be connected in circuit in a high voltage power line extending between said high voltage alternating current load and a source of high voltage alternating current power;
  vacuum circuit breaker means, including solenoid-tripping means, adapted to be connected in series with said current limiting fuse means between said distribution system and said source of power;
  overload current detecting means for detecting fault currents in said distribution system and providing a tripping signal to trip said vacuum circuit breaker means;
  winding means inductively coupled to at least one conductor of said power line and insulated from said power line;
  rectifying means for rectifying an alternating current voltage derived from said winding means and producing a uni-directional current;
  electrical energy storage means for storing electrical energy derived from said uni-directional current;
  overvoltage protection means for protecting said rectifying means and said electrical energy storage means; and
  circuit means for energizing the solenoid of said solenoid-operated tripping means from said electrical energy storage means under the control of said overload current detecting means.

10. A short circuit protection system as claimed in claim 9 in which neither said current limiting fuse means nor said vacuum circuit breaker means alone is capable of protecting said distribution system from overcurrent over the complete range of fault current magnitudes extending from the full load rating of said distribution system to the maximum current rating of said current limiting fuse means.

11. A short circuit protection system as claimed in claim 9 in which said current limting fuse means, said vacuum circuit breaker means and said overload current detecting means are all immersed in an insulating fluid.

12. A short circuit protection system as claimed in claim 11 in which said insulating fluid is contained in a single tank.

13. A short circuit protection system as claimed in claim 11 in which said fault current detecting means comprise solid state overcurrent relay means, and said solid state overcurrent relay means are immersed in said insulating fluid.

14. A short circuit protection system as claimed in claim 13 in which said insulating fluid is contained in a single tank.

15. A short circuit protection system as claimed in claims 1, 2, 3, 4, 5, 6, 7, 8, 9, 10, 11, 12, 13 or 14 wherein sufficient energy to trip said circuit breaker means is stored in said electrical energy storage means before said overload current detecting means trips said circuit breaker means following the closing of said circuit breaker means into a fault on said distribution system.

* * * * *